(12) United States Patent
Shelton

(10) Patent No.: US 6,418,659 B1
(45) Date of Patent: Jul. 16, 2002

(54) FISHING LURE SKIRT AND METHOD

(75) Inventor: Michael T. Shelton, Goose Creek, SC (US)

(73) Assignee: Z-Man Fishing Products, Inc., Hanahan, SC (US)

( * ) Notice: Subject to any disclaimer, the term of this patent is extended or adjusted under 35 U.S.C. 154(b) by 0 days.

(21) Appl. No.: 09/580,668

(22) Filed: May 26, 2000

(51) Int. Cl.[7] .............................................. A01K 85/00
(52) U.S. Cl. ....................... 43/42.53; 43/42.28; 156/192
(58) Field of Search ............................ 43/42.53, 42.24, 43/42.28; 156/184, 191, 192

(56) References Cited

U.S. PATENT DOCUMENTS

| | | | | |
|---|---|---|---|---|
| 1,340,813 A | * | 5/1920 | Bernard | 156/191 |
| 2,365,502 A | * | 12/1944 | Weesner | 43/42.28 |
| 2,495,734 A | * | 1/1950 | Katzman et al. | 156/184 |
| 2,686,382 A | * | 8/1954 | Fisher | 43/42.28 |
| 2,735,970 A | * | 2/1956 | Peck et al. | 156/184 |
| 3,021,632 A | * | 2/1962 | Gombar | 43/42.28 |
| 4,335,495 A | * | 6/1982 | Buchanan | 43/42.53 |
| 4,619,067 A | * | 10/1986 | West | 43/42.28 |
| 5,960,580 A | * | 10/1999 | Link | 43/42.53 |
| 6,082,038 A | * | 7/2000 | Link | 43/42.24 |
| 6,192,616 B1 | * | 2/2001 | Kent | 43/42.24 |

FOREIGN PATENT DOCUMENTS

| | | | | |
|---|---|---|---|---|
| FR | 2581288 B1 | * | 11/1986 | 43/42.53 |
| FR | 2604056 B1 | * | 3/1988 | 43/42.28 |
| GB | 667034 B1 | * | 2/1952 | 43/42.53 |

* cited by examiner

*Primary Examiner*—Darren W. Ark
(74) *Attorney, Agent, or Firm*—Pyle & Piontek

(57) ABSTRACT

A fishing lure skirt is prepared from a flat blank of cured elastomer having a head and trailing filaments. A strip of solid, tacky uncured elastomer is applied to the head, and the head is wrapped around a cylindrical mandrel, with the uncured strip facing outwardly to form a tubular head. The uncured strip is then cured by the application of heat.

7 Claims, 1 Drawing Sheet

FISHING LURE SKIRT AND METHOD

BACKGROUND OF THE INVENTION

Fishing skirts are well known in the art and generally comprise a head or collar member and a plurality of attached trailing strands made from an elastomer. The strands can pulsate to attract fish and can conceal a hook. The skirt can be formed from a flat sheet of cured elastomer which is cut to have a waistband at one end and elongate trailing filaments at the other end, and the skirt may be wrapped around a lure such as a jig or spinner in the form of a tube and attached by securing the waistband around a portion of the lure, usually a groove or collar on the lure. The skirt, being made of an elastomer, can be compounded with various colors, glitter and the like to attract fish under various fishing conditions. More than one overlapping skirt can be provided to achieve multiple layers and a variety of effects. The skirt may be attached to the lure by a flexible collar, rubber band, or may be tied on with thread.

One method of making a fishing lure skirt is described in U.S. Pat. No. 5,960,580. In order to make the skirt, an apertured core of cured silicone rubber is provided. The inner surface of the waistband of a skirt blank is coated with a liquid adhesive, wrapped around the core and the adhesive is allowed to cure. To maintain tension on the wrapped portion, apertures must be formed in the waistband and passed over pins to hold the wrapped portion under tension during curing. This is a time consuming process requiring special equipment. Also, there is no opportunity to insert glitter or color to the head of the skirt.

As mentioned above, many conventional skirts have a collar having an axial bore to enable installation of the skirt over a circular collar on a lure. Many skirt designs are not well adapted for this purpose and tend to break or tear.

SUMMARY OF THE INVENTION

In accordance with the present invention, one or more flat blanks of pre-cured silicone rubber are provided having a collar or waistband portion at one end and a plurality of cut filaments at the other end. A layer or strip of solid uncured, tacky silicone rubber is applied to one surface of the waistband, with the uncured strip being on the side of the skirt which will face outwardly upon assembly. The uncured layer is soft and tacky and is furnished in calendered sheet form.

Following application of the uncured layer, a elongated mandrel is applied over the cured side, and the layers are wrapped around the mandrel, preferably by rolling the mandrel around its axis. Depending on the shape of the mandrel and the deployment of the uncured strip, this causes an open end or closed end tube to be formed with portions of the uncured strip overlapping and holding the assembly together.

The silicone elastomer employed in the skirt and the bonding strip is a high consistency solid elastomer having an addition cure such as platinum to provide the highest possible elongation, strength and tear resistance. After the skirt has been formed in tubular form, the uncured elastomer is cured around the mandrel by the application of heat, to form a resilient high strength structure with the uncured strip being cured to itself and with the pre-cured collar portion.

As an additional step, after formation on the mandrel, the outer exposed uncured layer may be coated with decorative pigments or glitter particles, and this may be pressed or rubbed into the uncured layer prior to curing. As a result, upon curing, the head or collar of the skirt will have a more desirable and distinctive appearance.

It has been found that the method of the present invention is very simple to execute and produces a very durable collar a head to the skirt, since the uncured strip can vulcanize to itself and to the previously cured skirt blank. The solid uncured layer provides a more durable structure than an applied liquid adhesive layer, and no adhesion to a separate permanent support core is required.

DESCRIPTION OF THE PREFERRED EMBODIMENTS

Figure 1:
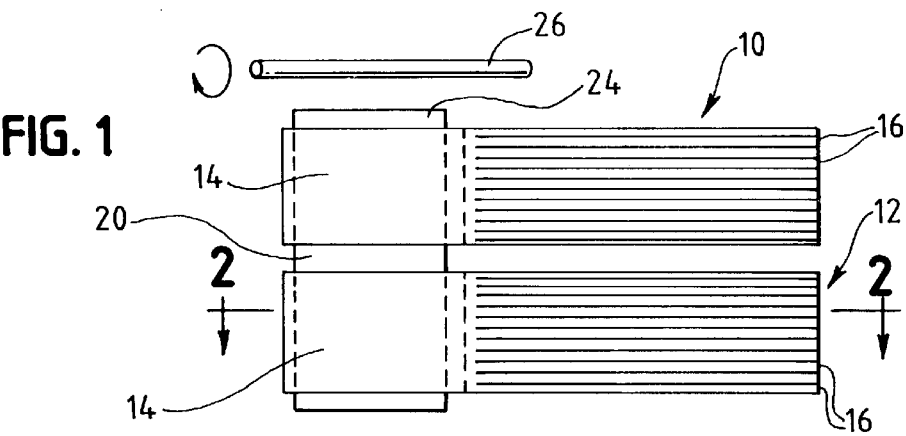
FIG. 1 is a plan view of an assembly for making the fishing lure skirt of the present invention.

FIG. 1 shows a pair of side by side flat skirt blanks 10 and 12, which are cut from pre-cured silicone rubber. These blanks 10 and 12 are in the form of flat sheets having a leading tab or waistband 14 and a plurality of finely divided trailing filaments 16, which may comprise cut parallel strips or any suitable design of cut to provide filaments. During the compounding of the solid elastomer, which is normally a clear color, various appearance enhancing agents may be added, such as colors, fine glitter particles and the like.

While various types of uncured silicone elastomers are available, the type used in the present invention are millable high consistency silicone elastomers. These elastomers can be cured by at least two mechanisms, namely free radical cure using peroxide catalysts, or addition cure using a noble metal such as platinum. Silicone elastomers capable of additional curing are preferred to enhance physical properties.

The uncured elastomer, together with any additives and curing agents, is mixed in a mill and passed through a calender to form sheets, followed by curing using heat at temperatures and durations specified by the resin supplier.

In order to provide a durable skirt, it is preferred that the cured sheet has a minimum tensile strength of 1100 psi, a minimum elongation of 450 percent and a minimum tear strength of 150 Die B, ppi., using standard test methods. The cured sheets may be cut or blanked into rectangles such as shown in FIG. 1 or into other desired shapes. The thickness of the sheets is preferably in the order of from 0.010 to 0.020 inches.

The method of the present invention contemplates the formation of a skirt having a single layer or the continuous formation of a skirt having two or more layers. FIG. 1 shows the formation of a two layer skirt having two blanks 10 and 12.

In order to form the collar on the front continuous portion of the skirt, a thin sheet 20 of solid, tacky uncured layer of silicone elastomer is employed as shown. Preferably, the sheet, when cured, will have the same physical properties as the pre-cured portion of the skirt.

Figure 2:
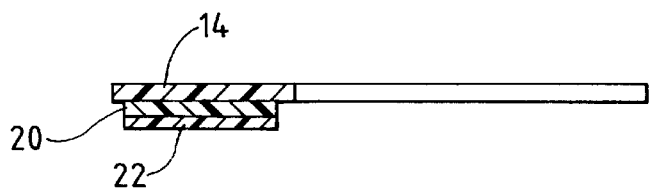
FIG. 2 is a sectional view along lines 2—2 of FIG. 1.

The uncured elastomer is passed through a calender to produce a thin sheet 20 using conventional methods. The uncured elastomer may be initially collected on top of a release sheet 22 (FIG. 2) such as a sheet of polyester, such that the combination can be rolled up for easy dispensing. At this stage, the uncured sheet 20 of elastomer is tacky.

The tabs or waistbands 14 of two or more skirt blanks 10 and 12 are applied over a strip of the uncured elastomer in generally parallel fashion, as shown in FIG. 1, with the filaments facing generally in the same direction, with the waistbands adhering to the uncured strip. The uncured strip 20 may have side tabs such as 24 to facilitate the subsequent forming operation.

Figure 3:
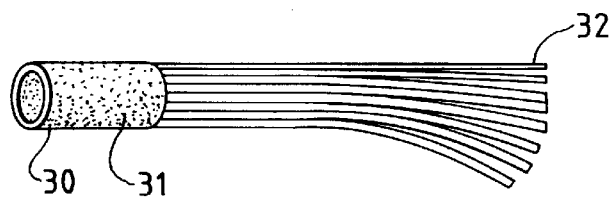
FIG. 3 is a view of a fishing lure skirt assembled using the components shown in FIGS. 1 and 2.

A cylindrical mandrel 26 is employed and is arranged generally in parallel with the longitudinal axis of the blanks. If the assembly of sheets is disposed on a flat surface, it is very easy to roll the mandrel 26, in the rotary direction indicated by the arrow and across the assembly, so that the flat assembly is in the form of a cylindrical collar 30 having trailing filaments 32 as shown in FIG. 3, with the yet uncured layer or strip of uncured elastomer 20 being disposed on, and entirely covering, the outside surface of the collar. The entire assembly may then be inserted into an oven such as a hot air oven and heated until the uncured portion is cured, forming a solid elastomeric composite collar 30 of high durability.

Prior to curing, it is possible to apply glitter particles 31 to the exposed uncured outer layer. These particles or dust may be rubbed into the tacky elastomer to provide an attractive permanent coating which are bonded to the surface upon curing of the elastomer layer.

Figure 4:
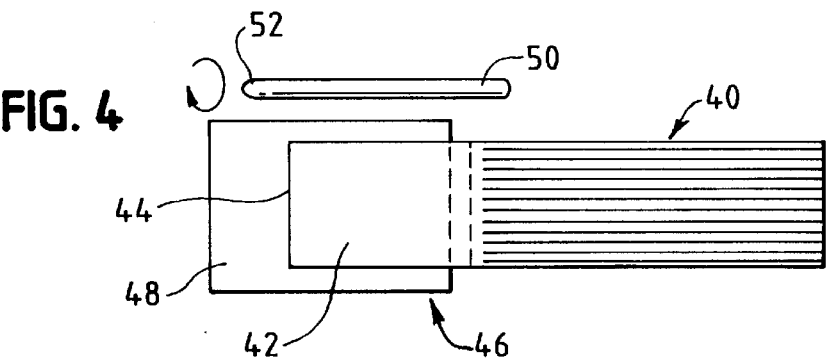
FIG. 4 is a plan view showing assembly of an alternative type of skirt of the present invention.

FIG. 4 illustrates a skirt blank 40 comprising a waist portion 42 having a leading edge 44. In this embodiment, the uncured strip 46 of uncured silicone rubber is not substantially coextensive with the waist portion 42 but has an exposed portion 48 extending beyond the leading edge 44. The mandrel 50 has a rounded nose 52 which overlies the exposed portion 48. The mandrel is rolled across the waist and exposed portion such that a closure of uncured elastomer is formed in the leading portion of the skirt. Any excess material may be trimmed from the nose, glitter may be applied as described previously, and he uncured elastomer is cured with the mandrel in place by application of heat.

Figure 5:
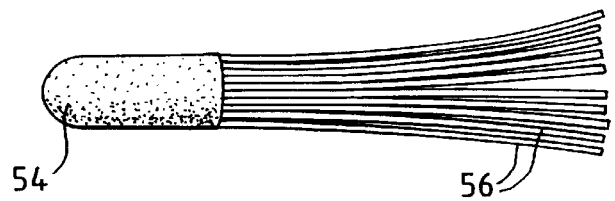
FIG. 5 is a side view of a skirt made in accordance with the embodiment shown in FIG. 4.

The resulting product is shown in FIG. 5 in which the lure has a continuous nose portion 54 without a central opening, and a trailing skirt 56.

The mandrels used herein preferably have an anti-stick surface, such as a Teflon rod or a rod treated with a release agent, to prevent sticking of the elastomer to the mandrel.

To effect the curing cycle, any convenient source of heat may be employed, for example an electric or gas operated oven operating at 280° to 350° degrees F. for a period of 1 to 5 minutes to achieve a cure temperature in the uncured elastomer as specified by the supplier, typically in the order of 280° to 350° degrees F.

What is claimed is:

1. A method for making a fishing lure skirt having a front collar and a trailing portion, said method comprising the steps of providing a flat blank of pre-cured elastomer having a head portion and a trailing portion, applying a strip of solid uncured tacky elastomer to the head portion, wrapping the head portion around a mandrel with the uncured elastomer strip facing outwardly to bind portions of the uncured strip together and to form a skirt having a head, and then heating the skirt to cure the uncured strip.

2. The method of claim 1 wherein said flat blank is substantially rectangular, and said trailing portion comprises filaments.

3. The method of claim 1 wherein said blank is composed of pre-cured silicone elastomer.

4. The method of claim 1 wherein said head comprising uncured elastomer is coated with decorative particles prior to curing.

5. The method of claim 4 wherein said decorative particles are glitter particles.

6. The method claim 1 wherein the head has a central opening.

7. The method of claim 1 wherein a plurality of flat blanks are employed, and a single strip of uncured elastomer is applied to the head portions of the blanks.

\* \* \* \* \*